US012596319B2

(12) United States Patent
Ishikawa et al.

(10) Patent No.: US 12,596,319 B2
(45) Date of Patent: Apr. 7, 2026

(54) MEDIA DETECTION APPARATUS, IMAGE FORMING SYSTEM, AND RECORDING MEDIUM

(71) Applicant: Konica Minolta, Inc., Tokyo (JP)

(72) Inventors: Akimasa Ishikawa, Hino (JP); Hitoshi Asano, Toyokawa (JP); Yumiko Izumiya, Hachioji (JP); Yasuo Koyanagi, Hachioji (JP); Hiroyuki Yoshikawa, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 106 days.

(21) Appl. No.: 18/430,060

(22) Filed: Feb. 1, 2024

(65) Prior Publication Data

US 2024/0272071 A1 Aug. 15, 2024

(30) Foreign Application Priority Data

Feb. 15, 2023 (JP) ................................. 2023-021258

(51) Int. Cl.
| | |
|---|---|
| *G03G 15/00* | (2006.01) |
| *G01N 21/47* | (2006.01) |
| *G01N 21/89* | (2006.01) |
| *G03G 15/16* | (2006.01) |
| *G03G 21/20* | (2006.01) |

(52) U.S. Cl.
CPC ......... *G03G 15/5029* (2013.01); *G03G 15/16* (2013.01); *G03G 21/20* (2013.01); *G03G 21/203* (2013.01); *G01N 21/4738* (2013.01); *G01N 2021/8917* (2013.01); *G03G*

*2215/00603* (2013.01); *G03G 2215/00751* (2013.01); *G03G 2215/00772* (2013.01); *G03G 2215/00776* (2013.01)

(58) Field of Classification Search
CPC .... G03G 15/5029; G03G 15/16; G03G 21/20; G03G 21/203; G03G 2215/00603; G03G 2215/00772; G03G 2215/00776; G03G 2215/00751; G01N 21/4738; G01N 2021/8917
See application file for complete search history.

(56) References Cited

U.S. PATENT DOCUMENTS

| | | | | |
|---|---|---|---|---|
| 2009/0263149 A1* | 10/2009 | Makino | .............. | G03G 15/1675 399/44 |
| 2018/0004114 A1* | 1/2018 | Nagaya | .................. | G03G 21/16 |

FOREIGN PATENT DOCUMENTS

| | | | |
|---|---|---|---|
| JP | 2013-057513 A | 3/2013 | |

* cited by examiner

*Primary Examiner* — Joseph S Wong
(74) *Attorney, Agent, or Firm* — Squire Patton Boggs (US) LLP

(57) ABSTRACT

A media detection apparatus for detecting moisture information corresponding to a moisture amount or a moisture percentage of a sheet, the media detection apparatus comprising:
  a light emitter that emits light;
  a light receiver that receives the light reflected off the sheet or transmitted through the sheet; and
  a first hardware processor that determines the moisture information on the basis of temperature information corresponding to a temperature of the media detection apparatus and an output of the light receiver.

29 Claims, 7 Drawing Sheets

FIG.4A
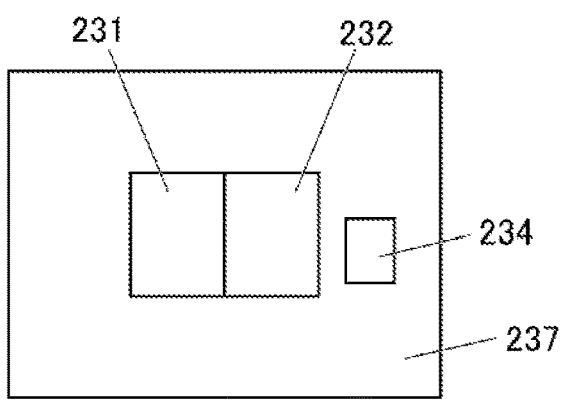
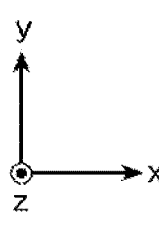
FIG.4B
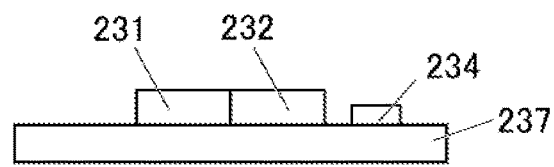
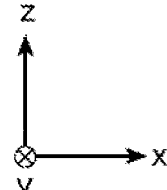
FIG.4C
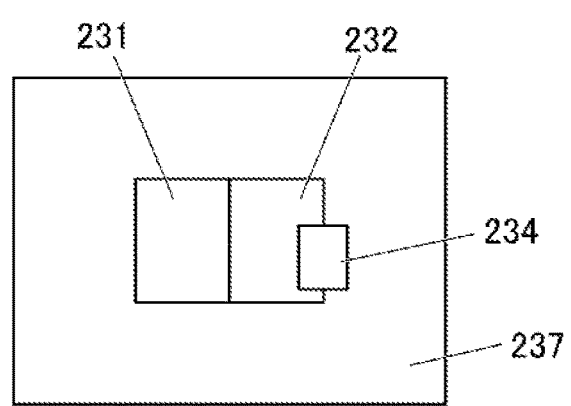
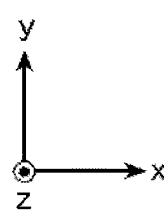
FIG.4D
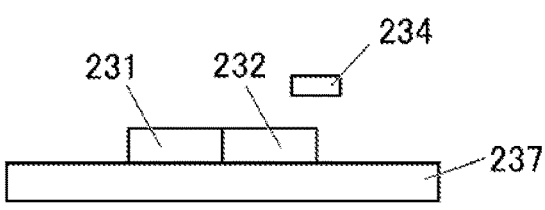
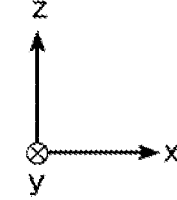

FIG.5

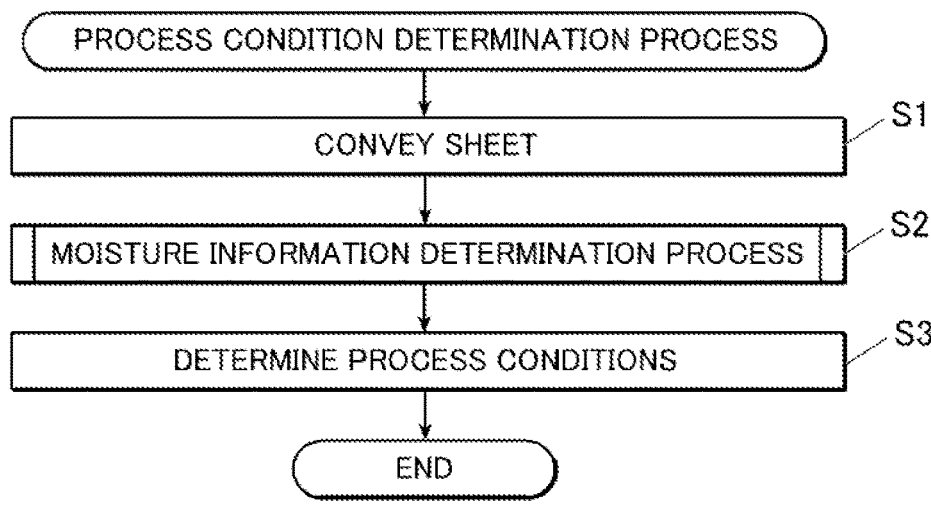

PROCESS CONDITION DETERMINATION PROCESS

CONVEY SHEET — S1

MOISTURE INFORMATION DETERMINATION PROCESS — S2

DETERMINE PROCESS CONDITIONS — S3

END

FIG.6

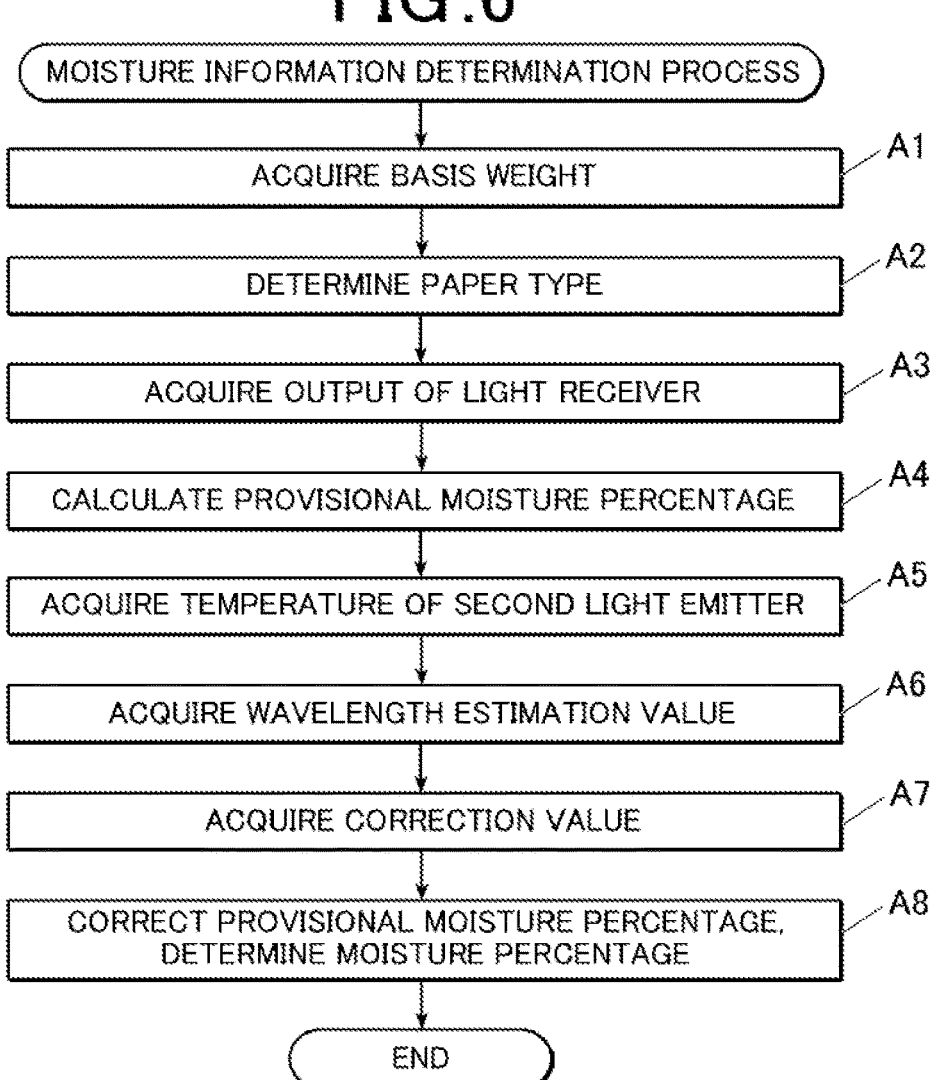

MOISTURE INFORMATION DETERMINATION PROCESS

ACQUIRE BASIS WEIGHT — A1

DETERMINE PAPER TYPE — A2

ACQUIRE OUTPUT OF LIGHT RECEIVER — A3

CALCULATE PROVISIONAL MOISTURE PERCENTAGE — A4

ACQUIRE TEMPERATURE OF SECOND LIGHT EMITTER — A5

ACQUIRE WAVELENGTH ESTIMATION VALUE — A6

ACQUIRE CORRECTION VALUE — A7

CORRECT PROVISIONAL MOISTURE PERCENTAGE, DETERMINE MOISTURE PERCENTAGE — A8

END

FIG.7

| DETECTED TEMPERATURE (°C) | WAVELENGTH ESTIMATION VALUE | |
| --- | --- | --- |
| | SECOND NEAR-INFRARED LIGHT | |
| 10 | 1250nm | 1400nm |
| 20 | 1300nm | 1450nm |
| 50 | 1400nm | 1500nm |

FIG.8A

| FOR PLAIN PAPER | | | | |
| --- | --- | --- | --- | --- |
| WAVELENGTH ESTIMATION VALUE | | EXAMPLE OF PROVISIONAL MOISTURE PERCENTAGE | EXAMPLE OF MOISTURE PERCENTAGE CORRECTION VALUE |
| SECOND NEAR-INFRARED LIGHT | FIRST NEAR-INFRARED LIGHT | | |
| 1250nm | 1400nm | 5% | +5% |
| 1300nm | 1450nm | 10% | 0 |
| 1400nm | 1500nm | 20% | −10% |

FIG.8B

| FOR CARDSTOCK | | | | |
| --- | --- | --- | --- | --- |
| WAVELENGTH ESTIMATION VALUE | | EXAMPLE OF PROVISIONAL MOISTURE PERCENTAGE | EXAMPLE OF MOISTURE PERCENTAGE CORRECTION VALUE |
| SECOND NEAR-INFRARED LIGHT | FIRST NEAR-INFRARED LIGHT | | |
| 1250nm | 1400nm | 5% | +5% |
| 1300nm | 1450nm | 10% | 0 |
| 1400nm | 1500nm | 20% | −5% |

| PRELIMINARILY MEASURED VALUE OF WAVELENGTH | | EXAMPLE OF PROVISIONAL MOISTURE PERCENTAGE | EXAMPLE OF MOISTURE PERCENTAGE CORRECTION VALUE |
|---|---|---|---|
| SECOND NEAR-INFRARED LIGHT | FIRST NEAR-INFRARED LIGHT | | |
| 1250nm | 1400nm | 5% | +5% |
| 1300nm | 1450nm | 10% | 0 |
| 1400nm | 1500nm | 20% | -10% |

MEDIA DETECTION APPARATUS, IMAGE FORMING SYSTEM, AND RECORDING MEDIUM

CROSS-REFERENCE TO RELATED APPLICATIONS

The entire disclosure of Japanese Patent Application No. 2023-021258 filed on Feb. 15, 2023 is incorporated herein by reference in its entirety.

BACKGROUND OF THE INVENTION

Technical Field

The present invention relates to a media detection apparatus, an image forming system, and a recording medium.

Description of Related Art

In a conventionally known image forming apparatus, a media sensor is installed partway along a conveyance path of a sheet, and characteristic values of a sheet transported along the conveyance path are detected by the media sensor. The image forming apparatus determines image forming conditions in accordance with the characteristic values of the sheet detected by the media sensor, and forms an image on the sheet.

For example, JP 2013-057513A describes a moisture sensor with a light emitter including a light-emitting diode (LED) and a light receiver including a photodiode (PD) is installed to measure the moisture percentage of a sheet.

SUMMARY OF THE INVENTION

However, when the moisture percentage of a sheet is measured using such a moisture sensor, it has been found that the measurement result may vary even if the sheet is in the same state. For example, it has been found that in a case where the moisture percentage is measured while sheets are continuously passed through during a job, the moisture percentage changes although the sheets are in the same state, and error occurs with respect to the original moisture percentage of the sheets.

An object of the present invention is to provide a media detection apparatus, an image forming system, and a recording medium that can more accurately detect moisture information corresponding to the moisture amount or the moisture percentage of a sheet.

To achieve at least one of the abovementioned objects, according to an aspect of the present invention, a media detection apparatus reflecting one aspect of the present invention is a media detection apparatus for detecting moisture information corresponding to a moisture amount or a moisture percentage of a sheet, the media detection apparatus including:

a light emitter that emits light;

a light receiver that receives the light reflected off the sheet or transmitted through the sheet; and a first hardware processor that determines the moisture information on the basis of temperature information corresponding to a temperature of the media detection apparatus and an output of the light receiver.

To achieve at least one of the abovementioned objects, according to an aspect of the present invention, an image forming system reflecting one aspect of the present invention includes:

an image former that forms an image on a sheet;

a media detection apparatus that detects moisture information corresponding to a moisture amount or a moisture percentage of the sheet; and a second hardware processor that determines process conditions in the image former, wherein the media detection apparatus includes a light emitter that emits light and a light receiver that receives the light reflected off the sheet or transmitted through the sheet, and the second hardware processor determines the process conditions on the basis of temperature information corresponding to a temperature of the media detection apparatus and an output of the light receiver.

To achieve at least one of the abovementioned objects, according to an aspect of the present invention, a recording medium reflecting one aspect of the present invention is a non-transitory computer-readable recording medium storing a media detection program for detecting moisture information corresponding to a moisture amount or a moisture percentage of a sheet, the media detection program causing a computer to execute:

acquiring temperature information corresponding to a temperature of a media detection apparatus including a light emitter that emits light and a light receiver that receives the light reflected off the sheet or transmitted through the sheet; and determining the moisture information on the basis of temperature information corresponding to a temperature of the media detection apparatus and an output of the light receiver.

To achieve at least one of the abovementioned objects, according to an aspect of the present invention, a recording medium reflecting one aspect of the present invention is a non-transitory computer-readable recording medium storing a process condition control program for determining process conditions for forming an image on a sheet in an image former, the process condition control program causing a computer to execute:

acquiring temperature information corresponding to a temperature of a media detection apparatus including a light emitter that emits light and a light receiver that receives the light reflected off the sheet or transmitted through the sheet; and determining the moisture information on the basis of temperature information corresponding to a temperature of the media detection apparatus and an output of the light receiver.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

3

Figures 9, 10:
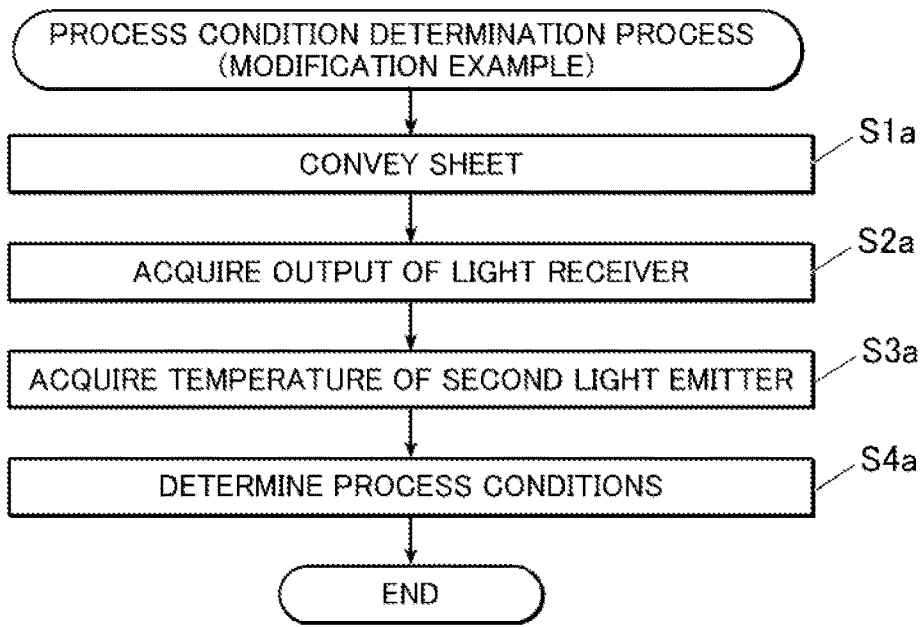

FIG. 4A is a diagram illustrating an example of a position where a temperature detection sensor is disposed;

FIG. 4B is a diagram illustrating an example of a position where a temperature detection sensor is disposed;

FIG. 4C is a diagram illustrating an example of a position where a temperature detection sensor is disposed;

FIG. 4D is a diagram illustrating an example of a position where a temperature detection sensor is disposed;

FIG. 5 is a flowchart illustrating the flow of a process condition determination process executed by an image forming system;

FIG. 6 is a flowchart illustrating the flow of a moisture information determination process executed by a media detection apparatus;

FIG. 7 is a diagram illustrating an example of a wavelength estimation value table for light emitted by a light emitter;

FIG. 8A is a diagram illustrating an example of a correction value table for plain paper;

FIG. 8B is a diagram illustrating an example of a correction value table for cardstock;

FIG. 9 is a table illustrating an example of an individual difference correction value table; and FIG. 10 is a flowchart illustrating the flow of a process condition determination process executed by an image forming system according to a modification example.

DETAILED DESCRIPTION

Hereinafter, one or more embodiments of the present invention will be described with reference to the drawings. However, the scope of the invention is not limited to the disclosed embodiments. Note that in embodiments of the present invention, an image forming apparatus included in an image forming system will be described by taking a system color image forming apparatus as an example, but the present invention is not limited thereto and can also be applied to, for example, a monochrome image forming apparatus.

1. Configuration of Image Forming System

Figure 1:
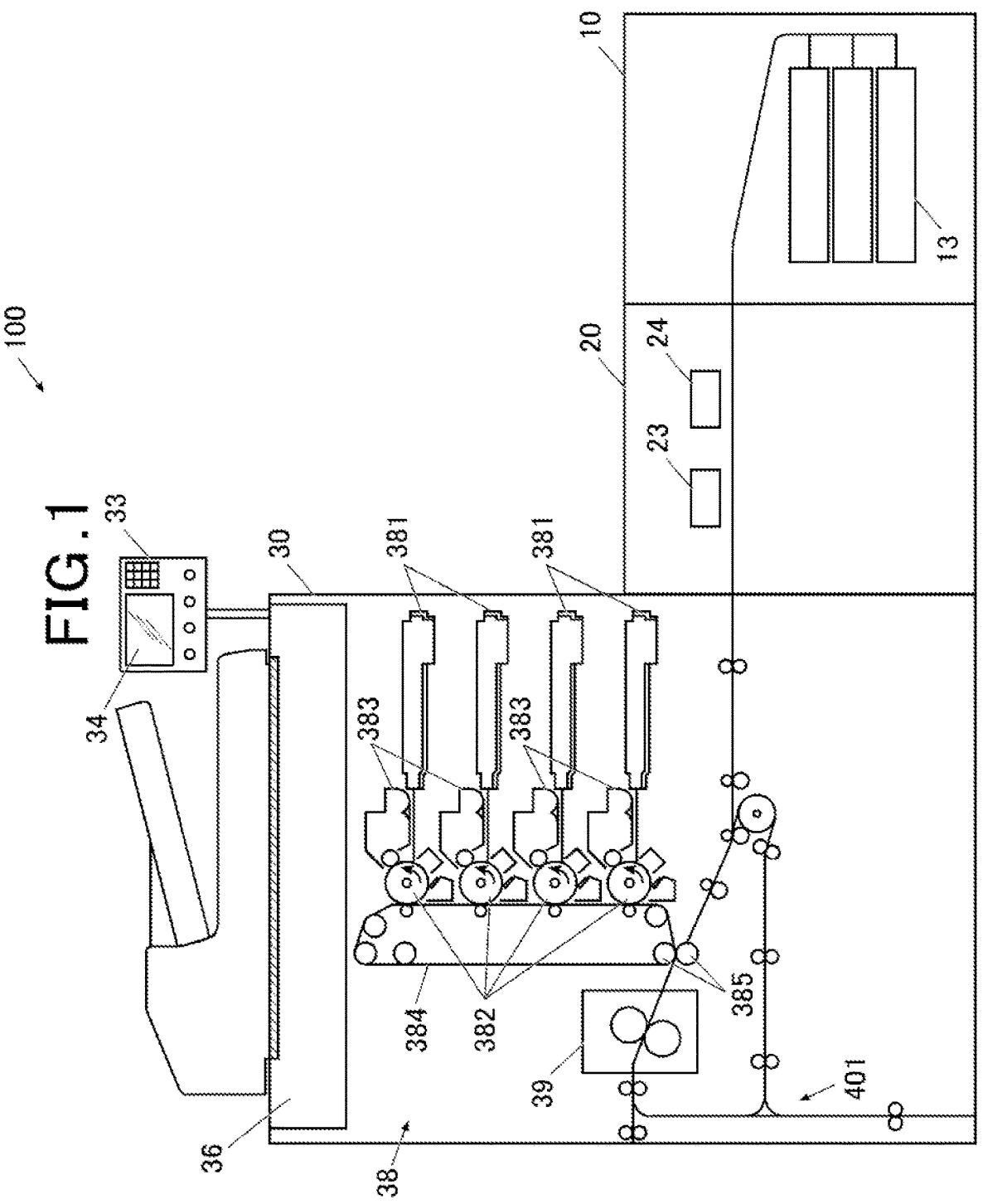
FIG. 1 is a diagram illustrating a schematic configuration of an image forming system according to the present embodiment.
Figure 2:
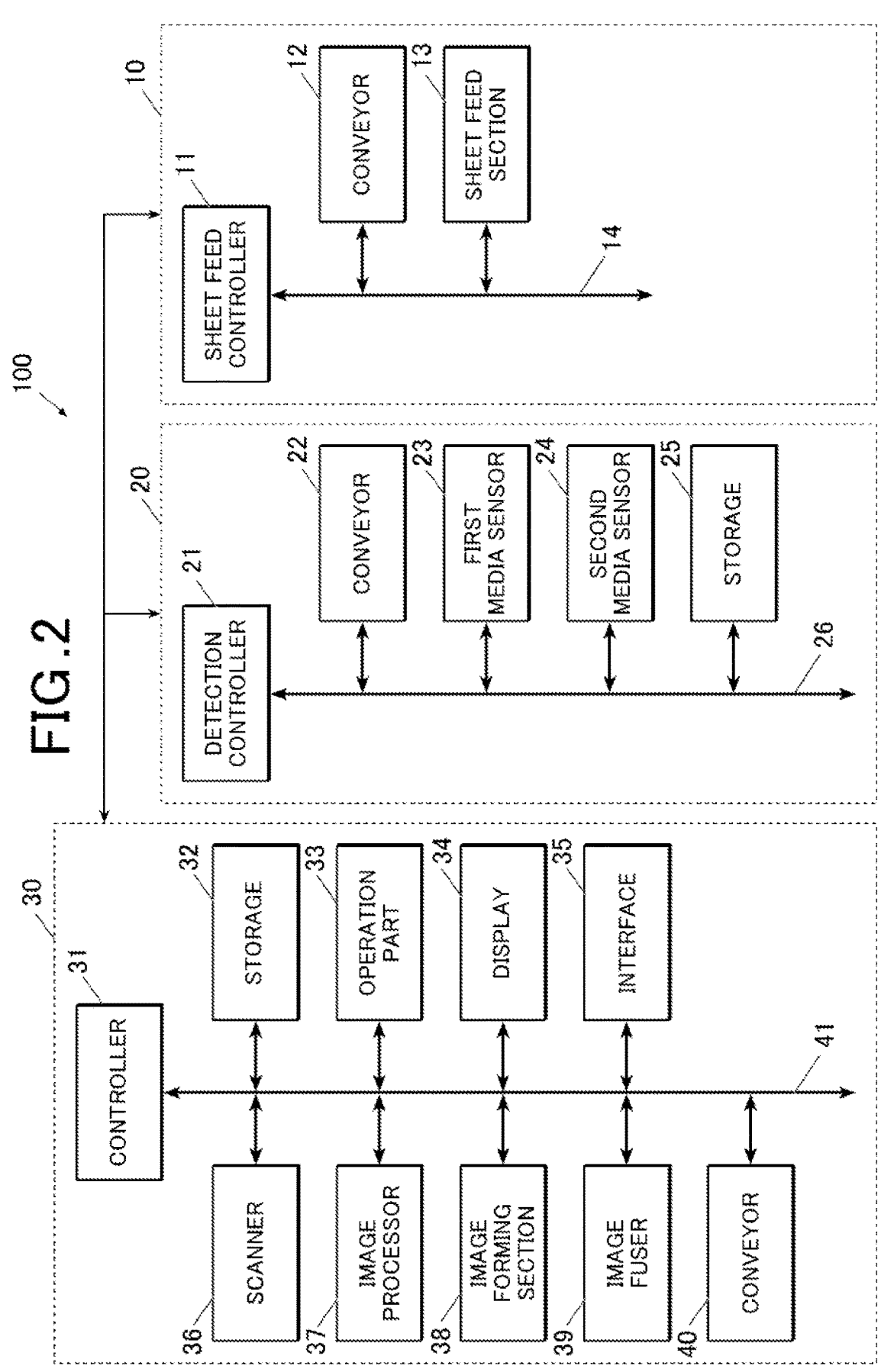
FIG. 2 is a block diagram illustrating a main functional configuration of the image forming system according to the present embodiment.

FIG. 1 is a diagram illustrating a schematic configuration of an image forming system 100 according to the present embodiment. FIG. 2 is a block diagram illustrating a main functional configuration of the image forming system 100.

The image forming system 100 according to the present embodiment includes a sheet feed device 10, a detection apparatus 20 which is a media detection apparatus, and an image forming apparatus 30.

In the image forming system 100, the sheet feed device 10, the detection apparatus 20, and the image forming apparatus 30 are arranged in this order from the upstream side along a conveyance direction of the sheet.

1-1. Configuration of Sheet Feed Device

The sheet feed device 10 includes a sheet feed controller 11, a conveyor 12, sheet feed sections 13, and the like.

The sheet feed controller 11 is connected to the conveyor 12 and the sheet feed sections 13 via a bus 14.

The sheet feed controller 11 includes a central processing unit (CPU), read-only memory (ROM), and random access memory (RAM).

The CPU of the sheet feed controller 11 reads a program stored in the ROM, loads the program into the RAM, and centrally controls each component of the sheet feed device 10 in accordance with the loaded program.

For example, the sheet feed controller 11 conveys a sheet from a sheet feed tray of any one of the sheet feed sections 13 to the detection apparatus 20 according to a job.

The conveyor 12 conveys the sheet via a conveyance path connecting the sheet feed sections 13 to the detection apparatus 20.

The sheet feed sections 13 include sheet feed trays storing sheets by predetermined paper types and sizes.

1-2. Configuration of Detection Apparatus

The detection apparatus 20 is provided on an upstream side of the image forming apparatus 30 in the sheet conveyance direction and detects a sheet conveyed from the sheet feed device 10.

The detection apparatus 20 includes a detection controller 21 (i.e., first hardware processor), a conveyor 22, a first media sensor 23, a second media sensor 24, and storage 25.

The detection controller 21 is connected to the conveyor 22, the first media sensor 23, the second media sensor 24, and the storage 25 via a bus 26.

The detection controller 21 includes a CPU, ROM, and RAM.

The CPU of the detection controller 21 reads a program stored in the ROM, loads the program into the RAM, and centrally controls each component of the detection apparatus 20 in accordance with the loaded program.

For example, the detection controller 21 causes the first media sensor 23 and the second media sensor 24 to detect a sheet conveyed from the sheet feed device 10. Then, the detection controller 21 causes the conveyor 22 to convey the detected sheet to the image forming apparatus 30.

The conveyor 22 includes a plurality of roller pairs and conveys a sheet conveyed from the sheet feed device 10 to the first media sensor 23 and the second media sensor 24.

Next, the conveyor 22 conveys the sheet detected by the first media sensor 23 and the second media sensor 24 to the image forming apparatus 30.

The first media sensor 23 is provided on the conveyance path on the upstream side in the sheet conveyance direction of an image forming section 38 (i.e., imager former), which will be described later, of the image forming apparatus 30.

Figure 3:
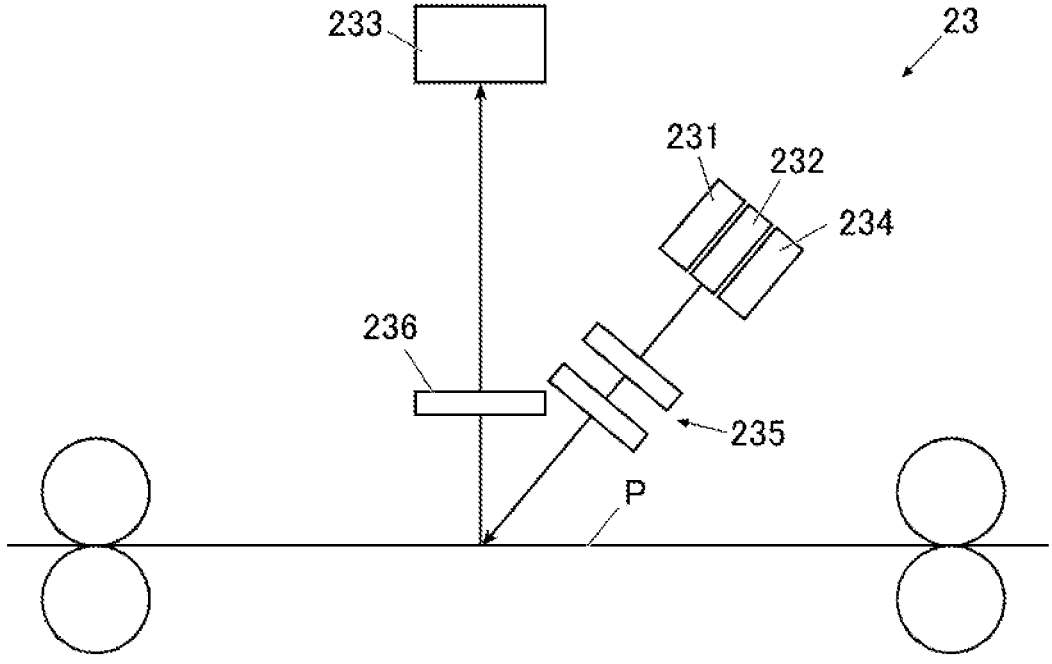
FIG. 3 is a diagram illustrating an example of a schematic configuration of a first media sensor.

FIG. 3 is a schematic diagram illustrating the configuration of the first media sensor 23.

As illustrated in FIG. 3, the first media sensor 23 includes a first light emitter 231, a second light emitter 232, a light receiver 233, a temperature detection sensor 234, and lenses 235, 236.

The first light emitter 231 and the second light emitter 232 are light emitters that emit light toward a sheet.

The first light emitter 231 emits first near-infrared light (reference light) in a specific wavelength band toward a sheet P. Specific examples of the first light emitter 231 include a light-emitting diode (LED) and the like.

The first near-infrared light is light for which the absorptance at the sheet P when the light is reflected off the sheet P does not depend on the moisture percentage of the sheet P.

The light receiver 233 receives, through the lens 236, the first near-infrared light emitted from the first light emitter 231 and reflected off the sheet P through the lens 235. Next, the light receiver 233 outputs, to the detection controller 21, information on a first light reception amount, which is the amount of the reflected first near-infrared light that is received. Specific examples of the light receiver 233 include a charge-coupled device (CCD), a complementary metal-oxide-semiconductor (CMOS) image sensor, and the like.

The second light emitter 232 emits second near-infrared light in a specific wavelength range toward the sheet P. Specific examples of the second light emitter 232 include an LED and the like.

The second near-infrared light is light for which the absorptance at the sheet P when the light is reflected off the sheet P varies depending on the moisture percentage of the sheet P.

The light receiver 233 receives, through the lens 236, the second near-infrared light emitted from the second light emitter 232 and reflected off the sheet P through the lens 235. Next, the light receiver 233 outputs, to the detection controller 21, information on a second light reception amount, which is the amount of the reflected second near-infrared light that is received.

That is, the first light emitter 231 and the second light emitter 232 emit light having wavelengths with different absorptance depending on the moisture of the sheet.

In addition, the second near-infrared light emitted by the second light emitter 232 is light having a wavelength with a greater absorptance depending on the moisture of the sheet than the first near-infrared light (reference light) emitted by the first light emitter 231.

The detection controller 21 determines the moisture percentage of the sheet on the basis of the ratio of the first light reception amount and the second light reception amount. The ratio of the first light reception amount and the second light reception amount is the ratio of the output of the light receiver 233 with respect to the first near-infrared light and the second near-infrared light.

Since the amount of the second near-infrared light absorbed increases with increasing moisture percentage of the sheet, the second light reception amount decreases. Therefore, a relational expression or table indicating a relation between the moisture percentage of the sheet and the ratio of the first light reception amount and the second light reception amount can be used as a basis for associating the ratio of the first light reception amount and the second light reception amount with the moisture percentage of the sheet, and calculating the moisture percentage of the sheet from the ratio of the first light reception amount and the second light reception amount.

The temperature detection sensor 234 detects the temperature of the second light emitter 232 and outputs a detection result to the detection controller 21.

That is, temperature information corresponding to the temperature of the media detection apparatus includes temperature information corresponding to the temperature of the second light emitter 232.

The temperature information corresponding to the temperature of the media detection apparatus includes temperature information corresponding to the temperature of the first media sensor 23 that includes the second light emitter 232.

The position where the temperature detection sensor 234 is disposed will now be described.

FIGS. 4A and 4B illustrate an example of the position where the temperature detection sensor 234 is disposed.

As illustrated in FIGS. 4A and 4B, the first media sensor 23 further includes a support member 237 supporting the first light emitter 231 and the second light emitter 232.

The support member 237 is a board, for example, the thickness direction of the board being the Z-axis direction, the width direction being the X-axis direction, and the depth direction being the Y-axis direction.

FIG. 4A is a diagram of the support member 237 viewed from the positive side in the Z-axis direction, and FIG. 4B is a diagram of the support member 237 viewed from the negative side in the Y-axis direction.

In the support member 237, the surface on which the first light emitter 231 and the second light emitter 232 are provided is on the positive side, in the Z-axis direction, of the X-Y plane.

The temperature detection sensor 234 is disposed in the vicinity of the second light emitter 232, as illustrated in FIGS. 4A and 4B. Further, the temperature detection sensor 234 is provided on the positive side, in the Z-axis direction, of the X-Y plane. That is, the temperature detection sensor 234 is disposed in contact with the support member 237.

In the example illustrated in FIGS. 4A and 4B, the temperature detection sensor 234 is disposed in non-contact with the second light emitter 232, but is not limited thereto. The temperature detection sensor 234 may be disposed in contact with the second light emitter 232. The arrangement in contact is preferable because the temperature of the second light emitter 232 can be detected more accurately.

Note that as illustrated in FIGS. 4C and 4D, the temperature detection sensor 234 may also be disposed on the positive side, in the Z-axis direction, of the second light emitter 232 without being in contact with the support member 237. That is, the temperature detection sensor 234 may be disposed in non-contact with and opposite to the second light emitter 232.

Note that FIG. 4C is a diagram of the support member 237 viewed from the positive side in the Z-axis direction, and FIG. 4D is a diagram of the support member 237 viewed from the negative side in the Y-axis direction.

The second media sensor 24 is provided on the conveyance path on the upstream side in the sheet conveyance direction of the image forming section 38 of the image forming apparatus 30.

The second media sensor 24 detects the basis weight of the sheet on the conveyance path and outputs a detection result to the detection controller 21. That is, the second media sensor 24 is a basis weight sensor.

Further, the basis weight of the sheet is included among physical properties corresponding to paper type.

The storage 25 includes storage means such as dynamic random access memory (DRAM), which is a semiconductor memory, and/or a hard disk drive (HDD).

The storage 25 stores a wavelength estimation value table used in a moisture information determination process to be described later.

In addition, the storage 25 stores a correction value table used in the moisture information determination process described later. In the present embodiment, the storage 25 stores a correction value table for normal paper and a correction value table for cardstock. In the present embodiment, plain paper refers to a sheet of paper with a basis weight of 200 g/m² or less, whereas cardstock refers to a sheet of paper with a basis weight greater than 200 g/m².

1-3. Configuration of Image Forming Apparatus

The image forming apparatus 30 forms a color image according to an electrophotographic method on the basis of image data obtained by reading an image from an original document or image data of a job received from an external apparatus (not illustrated).

The image forming apparatus 30 includes a controller 31 (second hardware processor), storage 32, an operation part 33, a display 34, an interface 35, a scanner 36, an image processor 37, an image forming section 38, an image fuser 39, a conveyor 40, and the like.

The controller 31 is connected to the storage 32, the operation part 33, the display 34, the interface 35, the scanner 36, the image processor 37, the image forming section 38, the image fuser 39, and the conveyor 40 via a bus 41.

The controller 31 includes a CPU, ROM, and RAM.

The CPU of the controller 31 reads a control program stored in the ROM, load the control program into the RAM, and centrally controls each component of the image forming apparatus 30 in accordance with the loaded program.

For example, the controller 31 causes the image processor 37 to perform predetermined image processing on the image data, and causes the storage 32 to store the processed image data. Furthermore, the controller 31 causes the conveyor 40 to convey a sheet, and causes the image forming section 38 to form an image on the sheet on the basis of image data stored in the storage 32.

The storage 32 includes storage means such as a DRAM, which is a semiconductor memory, and/or an HDD.

The storage 32 stores image data acquired by the scanner 36, image data externally inputted through the interface 35, and the like. Note that this image data and the like may be stored in RAM included in the controller 31.

The operation part 33 includes input devices such as operation keys and/or a touch screen disposed so as to be layered on or under a screen of the display 34. The operation part 33 converts input operations on these input devices into an operation signal and outputs the operation signal to the controller 31.

The display 34 includes a display device such as a liquid crystal display (LCD), and displays the state of the image forming system 100, an operation screen indicating the content of input operations on the touch screen, and the like.

The interface 35 is means for transmitting and receiving data to and from an external computer, another image forming apparatus, or the like. The interface 35 includes any of various types of serial interfaces, for example.

The scanner 36 reads an image formed on a sheet, generates image data including single-color image data for each R (red), G (green), and B (blue) color components, and stores the image data in the storage 32.

The image processor 37 includes, for example, a rasterization processor, a color converter, a tone corrector, and a halftone processor. The image processor 37 performs various kinds of image processing on image data stored in the storage 32 and stores the image data in the storage 32.

The image forming section 38 forms an image on a sheet on the basis of image data stored in the storage 32. The image forming section 38 includes four sets of exposure sections 381, photosensitive drums 382, and developing sections 383 corresponding to C (cyan), M (magenta), Y (yellow), and K (black) color components, respectively. Furthermore, the image forming section 38 includes a transfer body 384 and secondary transfer rollers 385.

The exposure section 381 includes a laser diode (LD) as a light-emitting element. The exposure section 381 drives the LD on the basis of image data, irradiating and exposing the charged photosensitive drum 382 with laser light to form an electrostatic latent image on the photosensitive drum 382. The developing section 383 develops the electrostatic latent image formed on the photosensitive drum 382 by supplying toner (color material) of a predetermined color (any of C, M, Y, and K) onto the exposed photosensitive drum 382 by a charged developing roller.

Images (single-color images) formed with the toner of each of C, M, Y, and K on the four photosensitive drums 382 corresponding to C, M, Y, and K are sequentially transferred from the respective photosensitive drums 382 onto the transfer body 384 in a superimposed manner. A color image having C, M, Y, and K color components is thus formed on the transfer body 384. The transfer body 384 is an endless belt wound around a plurality of transfer body conveyance rollers, and rotates in accordance with the rotation of each of the transfer body conveyance rollers.

The secondary transfer rollers 385 transfer the color image on the transfer body 384 onto a sheet fed from the sheet feed device 10. More specifically, the sheet and the transfer body 384 are nipped at a transfer nip portion formed by the pair of secondary transfer rollers 385 being pressed against each other. Next, a predetermined transfer voltage is applied to the secondary transfer rollers 385, whereby the toner forming the color image on the transfer body 384 is attracted to the sheet side and transferred to the sheet.

The image fuser 39 includes a fusing roller, a pressure roller, and the like, and performs a fusing process of fusing toner to a sheet by heating and pressing the sheet to which toner has been transferred.

The conveyor 40 includes a plurality of sheet conveyance rollers that convey a sheet by rotating while pinching the sheet, and conveys the sheet along a predetermined conveyance path.

The conveyor 40 includes a reversing mechanism 401 that reverses the front/back of the sheet subjected to the fusing process by the image fuser 39, and conveys the sheet to the secondary transfer rollers 385. When images are to be formed on both sides of a sheet in the image forming apparatus 30, the sheet is reversed front/back by the reversing mechanism 401, images are formed on both sides of the sheet, and then the sheet is delivered. In the case where an image is to be formed on only one side of the sheet, the sheet having an image formed on one side thereof is delivered without being reversed front/back by the reversing mechanism 401.

In the present embodiment, the controller 31 of the image forming apparatus 30 centrally controls the entire image forming system 100, but the present invention is not limited thereto. The detection controller 21 of the detection apparatus 20 may be configured to centrally control the entire image forming system 100.

2. Operations by Image Forming System

Next, operations by the image forming system 100 will be described.

FIG. 5 is a flowchart illustrating the flow of a process condition determination process executed when the image forming apparatus 30 receives image data and settings information of a print job via the interface 35.

The process condition determination process of FIG. 5 is executed by the CPU of the controller 31 of the image forming apparatus 30 in cooperation with a process condition control program stored in the ROM.

By executing the process condition determination process, the controller 31 determines process conditions for image formation by the image forming section 38, on the basis of moisture information corresponding to the moisture amount or the moisture percentage of the sheet. Here, the controller 31 functions as a process condition controller.

The process conditions are, for example, transfer conditions when a color image on the transfer body 384 is transferred to a sheet. The transfer conditions specifically include a transfer voltage value and a transfer current value to be applied to the secondary transfer rollers 385 when the color image on the transfer body 384 is transferred to the sheet.

Note that the controller 31 may determine process conditions other than the transfer conditions by executing the process condition determination process.

Further, the controller 31 may determine transfer conditions other than the transfer voltage value and the transfer current value to be applied to the secondary transfer rollers 385 by executing the process condition determination process.

2-1. Process Condition Determination Process

In the process condition determination process, first, the controller 31 causes the sheet feed device 10 to feed, from one of the sheet feed sections 13, a sheet (job target sheet) on which an image is to be formed in a print job, and conveys the sheet to the detection apparatus 20 (step S1).

Next, the controller 31 causes the detection apparatus 20 to perform a moisture information determination process on the job target sheet, and acquires moisture information corresponding to the moisture amount or the moisture percentage of the sheet from the detection apparatus 20 (step S2).

FIG. 6 illustrates a flowchart of the moisture information determination process.

The moisture information determination process of FIG. 6 is executed by the CPU of the detection controller 21 in cooperation with a media detection program stored in the ROM.

By executing the moisture information determination process, the detection controller 21 determines moisture information corresponding to the moisture amount or the moisture percentage of the sheet on the basis of temperature information corresponding to the temperature of the media detection apparatus (detection result from the temperature detection sensor 234) and the output of the light receiver 233. Here, the detection controller 21 functions as a moisture information controller.

2-2. Moisture Information Determination Process

First, the detection controller 21 uses the second media sensor 24 to detect the basis weight of the sheet on the conveyance path, and obtains a detection result (step A1).

Next, the detection controller 21 determines the paper type of the sheet on the basis of the basis weight of the sheet acquired in step A1 (step A2). That is, the detection controller 21 determines the paper type of the sheet on the basis of the detection result from the second media sensor 24. Here, the detection controller 21 functions as a paper type determiner.

For example, if the basis weight of the sheet is equal to or less than 200 g/m², the detection controller 21 determines that the sheet is plain paper. On the other hand, if the basis weight of the sheet is greater than 200 g/m², the detection controller 21 determines that the sheet is cardstock.

Next, the detection controller 21 acquires, from first media sensor 23, information on the first light reception amount and the second light reception amount as the output of the light receiver 233 (step A3).

Next, on the basis of the output of the light receiver 233 acquired in step A2, the detection controller 21 calculates and determines a provisional moisture percentage of the sheet from the ratio of the first light reception amount and the second light reception amount (step A4).

Next, detection controller 21 acquires the temperature of the second light emitter 232 from the temperature detection sensor 234 (step A5). Step A5 is an acquiring step.

Next, on the basis of the temperature of the second light emitter 232 acquired in step A5, the detection controller 21 acquires estimated wavelengths of the first near-infrared light and the second near-infrared light from the wavelength estimation value table (step A6).

FIG. 7 is a diagram illustrating an example of the wavelength estimation value table stored in the storage 25.

The inventor has studied the phenomenon that in a case where a moisture sensor is actually disposed as a media sensor in an image forming apparatus, the measurement result changes for a sheet in the same state, and as a result, has discovered the following phenomenon. Specifically, the inventor has found that the moisture sensitivity changes as the wavelength of light emitted by a light emitter (LED or the like) of the moisture sensor changes due to the temperature rise caused by the self-heating of the light emitter itself. It is found that such a phenomenon causes the problem in which error occurs in the moisture percentage of the sheet detected by the media sensor with respect to the original moisture percentage of the sheet.

The wavelength estimation value table shows the relationship between the detection result (detected temperature) by the temperature detection sensor 234, the wavelength estimation value of the first near-infrared light emitted by first light emitter 231, and the wavelength estimation value of the second near-infrared light emitted by second light emitter 232.

Note that instead of the wavelength estimation value table, the detection controller 21 may acquire wavelength estimation values for the first near-infrared light and the second near-infrared light from a relational expression indicating a relation among the detected temperature according to the temperature detection sensor 234, the wavelength estimation value of the first near-infrared light, and the wavelength estimation value of the second near-infrared light.

Next, on the basis of the paper type determined in step A2 and the wavelength estimation values for the first near-infrared light and the second near-infrared light acquired in step A6, the detection controller 21 acquires a correction value for correcting the provisional moisture percentage of the sheet from a correction value table (step A7).

That is, if the detection controller 21 determines that the paper type of the sheet is plain paper in step A2, the detection controller 21 acquires a correction value from a correction value table for plain paper. If the detection controller 21 determines in step A2 that the paper type of the sheet is cardstock, the detection controller 21 acquires a correction value from a correction value table for cardstock.

FIG. 8A illustrates an example of a correction value table for plain paper. FIG. 8B illustrates an example of a correction value table for cardstock.

In the examples illustrated in FIGS. 8A and 8B, a wavelength estimation value of 1450 nm for the first near-infrared light and a wavelength estimation value of 1300 nm for the second near-infrared light are set as reference wavelengths. Therefore, the correction value in this case is 0. Note that as illustrated in FIG. 7, this is a case in which the temperature detected by the temperature detection sensor 234 is 20° C.

Note that the wavelength estimation value for the first near-infrared light and the wavelength estimation value for the second near-infrared light serving as the reference wavelengths are not limited to the example illustrated in FIGS. 8A and 8B, and may be other wavelength estimation values.

In the example illustrated in FIG. 8A, when the wavelength estimation value for the first near-infrared light is 1400 nm, the wavelength estimation value for the second near-infrared light is 1250 nm, and the provisional moisture percentage of the sheet is 5%, for example, the correction value is +5%.

Further, when the wavelength estimation value for the first near-infrared light is 1500 nm, the wavelength estimation value for the second near-infrared light is 1400 nm, and the provisional moisture percentage of the sheet is 20%, for example, the correction value is −10%.

In the example illustrated in FIG. 8B, when the wavelength estimation value for the first near-infrared light is 1400 nm, the wavelength estimation value for the second near-infrared light is 1250 nm, and the provisional moisture percentage of the sheet is 5%, for example, the correction value is +5%.

Further, when the wavelength estimation value for the first near-infrared light is 1500 nm, the wavelength estimation value for the second near-infrared light is 1400 nm, and the provisional moisture percentage of the sheet is 20%, for example, the correction value is −5%.

As illustrated in FIGS. 8A and 8B, when the temperature detected by the temperature sensor 234 is lower than 20° C. (reference temperature), the correction value is a value that corrects by raising the provisional moisture percentage. In addition, when the temperature detected by the temperature detection sensor 234 is higher than 20° C. (reference temperature), the correction value is a value that corrects by lowering the provisional moisture percentage.

The detection controller 21 may acquire the correction value from a relational expression instead of a correction value table, the relational expression indicating a relationship among the wavelength estimation value for the first near-infrared light, the wavelength estimation value for the second near-infrared light, the provisional moisture percentage of the sheet, and the correction value.

Next, the detection controller 21 corrects the provisional moisture percentage of the sheet determined in step A4 with the correction value acquired in step A7, determines the moisture percentage of the sheet (step A8), and ends the process. Step A8 is a moisture information determining step.

The detection controller 21 determines provisional moisture information (moisture percentage) on the basis of the output of the light receiver 233 by executing the moisture information determination process above. The detection controller 21 then obtains an estimation value for the wavelengths of the light emitted by the light emitters on the basis of the temperature of the light emitters (the temperature detected by the temperature detection sensor 234). The detection controller 21 then determines the moisture information by correcting the provisional moisture information on the basis of the acquired estimation value for the wavelength.

In addition, the detection controller 21 executes the moisture information determination process above to determine the moisture information (moisture percentage) of the sheet while the sheet is being conveyed.

Note that the detection controller 21 may determine the moisture information of the sheet for each sheet to be conveyed, or may determine the moisture information (moisture percentage) of the sheet a plurality of times for one sheet to be conveyed.

That is, the detection controller 21 determines the moisture information (moisture percentage) of the sheet according to the temperature detected by the temperature detection sensor 234 while the sheet is being conveyed.

Note that in the moisture information determination process, the detection controller 21 may correct individual differences in the wavelengths of light emitted respectively by the first light emitter 231 and the second light emitter 232 due to individual differences (for examples, individual differences among LEDs).

In this case, the storage 25 stores an individual difference correction value table for correcting the individual differences of the first light emitter 231 and the second light emitter 232.

FIG. 9 illustrates an example of the individual difference correction value table.

In the example illustrated in FIG. 9, a preliminarily measured value of 1450 nm for the wavelength of the first near-infrared light and a preliminarily measured value of 1300 nm for the wavelength of the second near-infrared light are set as reference wavelengths. Therefore, the correction value in this case is 0.

Note that the preliminarily measured value for the wavelength of the first near-infrared light and the preliminarily measured value for the wavelength of the second near-infrared light serving as reference wavelengths are not limited to the example illustrated in FIG. 9, and may be other preliminarily measured values.

In the example illustrated in FIG. 9, when the preliminarily measured value for the wavelength of the first near-infrared light is 1400 nm, the preliminarily measured value for the wavelength of the second near-infrared light is 1250 nm, and the provisional moisture percentage of the sheet is 5%, for example, the correction value is +5%.

Further, when the preliminarily measured value for the wavelength of the first near-infrared light is 1500 nm, the preliminarily measured value for the wavelength of the second near-infrared light is 1400 nm, and the provisional moisture percentage of the sheet is 20%, for example, the correction value is −10%.

Returning to FIG. 5, the controller 31 determines, on the basis of the moisture information of the sheet determined in step S2, process conditions for image formation by the image forming section 38 (step S3) and ends the process.

Modification Example

Next, a modification example of the present invention will be described. In the modification example, components similar to those of the above embodiment are denoted by the same reference numerals, and description thereof will be omitted.

FIG. 10 is a flowchart illustrating the flow of a process condition determination process of the present modification example.

In the process condition determination process of the present modification example, the controller 31 performs step S1a, which is similar to the process condition determination process step S1 of the above embodiment.

Next, the controller 31 acquires, from the detection apparatus 20, information on the first light reception amount and the second light reception amount as the output of the light receiver 233 of the first media sensor 23 (step S2a).

Next, the controller 31 acquires, from the detection apparatus 20, the temperature of the second light emitter 232 as a detection result from the temperature detection sensor 234 (step S3a). Step S3a is an acquiring step.

Next, the controller 31 determines, on the basis of the output of the light receiver 233 acquired in step S2a and the temperature of the second light emitter 232 acquired in step S3a, process conditions for image formation by the image forming section 38 (step S4a), and ends the process. Step S4a is a process condition determining step. That is, in the present modification example, the controller 31 determines the process conditions directly from the output of the light receiver 233 and the temperature of the second light emitter 232, without the detection controller 21 determining the moisture information corresponding to the moisture amount or the moisture percentage of the sheet.

Although the present invention has been described on the basis of the above embodiment, the description in the above embodiment is of an example of the image forming system according to the present invention, and the present invention is not limited thereto.

For example, in the above embodiment, the detection controller 21 determines the moisture percentage of the sheet in the moisture information determination process, but is not limited thereto. The detection controller 21 may determine the moisture amount of the sheet.

Further, the detection controller 21 may determine an index indicating the moisture amount or the moisture percentage of the sheet in the moisture information determination process. The index indicating the moisture amount or the moisture percentage of the sheet is, for example, a voltage value or a current value output by the light receiver 233.

That is, the moisture information corresponding to the moisture amount or the moisture percentage of the sheet includes the moisture amount of the sheet, the moisture percentage of the sheet, and an index indicating the moisture amount or the moisture percentage of the sheet.

Furthermore, the detection controller 21 may determine the moisture information corresponding to the moisture amount or the moisture percentage of the sheet on the basis of the estimated values of the temperatures of the first light emitter 231 and the second light emitter 232, and the output of the light receiver 233.

For example, detection controller 21 calculates estimated values of the temperatures of the first light emitter 231 and the second light emitter 232 on the basis of the operation times of the first light emitter 231 and the second light emitter 232.

That is, the temperature information corresponding to the temperature of the media detection apparatus includes an estimated value of the temperature of the media detection apparatus, the estimated value being based on the operation times of the first light emitter 231 and the second light emitter 232.

In a case where the image forming apparatus 30 includes a detector that detects the temperature in the image forming apparatus 30, the detection controller 21 may determine the moisture information corresponding to the moisture amount or the moisture percentage of the sheet on the basis of a detection result from the detector and the output of the light receiver 233.

That is, the temperature information corresponding to the temperature of the media detection apparatus includes information on the temperature in the image forming apparatus 30.

In the above embodiment, the light receiver 233 receives light that is emitted from the first light emitter 231 and the second light emitter 232 and then reflected off the sheet P, but is not limited thereto. The light receiver 233 may be configured to receive light that is emitted from the first light emitter 231 and the second light emitter 232 and then transmitted through the sheet P.

3. Effects

As described above, the media detection apparatus (detection apparatus 20) of the present embodiment is a media detection apparatus for detecting moisture information corresponding to the moisture amount or the moisture percentage of a sheet, and includes a light emitter (first light emitter 231 and second light emitter 232) that emits light, a light receiver 233 that receives light reflected off or transmitted through the sheet, and a moisture information controller (detection controller 21) that determines moisture information on the basis of temperature information corresponding to the temperature of the media detection apparatus and the output of the light receiver 233.

Thus, it is possible to determine the moisture information corresponding to the moisture amount or the moisture percentage of the sheet according to the temperature information corresponding to the temperature of the media detection apparatus. Therefore, the moisture information corresponding to the moisture amount or the moisture percentage of the sheet can be detected more accurately.

In the media detection apparatus (detection apparatus 20) of the present embodiment, the moisture information controller (detection controller 21) determines the moisture information on the basis of the temperature information corresponding to the temperature of the light emitter (first light emitter 231 and second light emitter 232) and the output of the light receiver 233.

Thus, it is possible to determine the moisture information corresponding to the moisture amount or the moisture percentage of the sheet according to the temperature information corresponding to the temperature of the light emitters.

Furthermore, in the media detection apparatus (detection apparatus 20) according to the present embodiment, the light emitter includes the first light emitter 231 and the second light emitter 232 for emitting light having wavelengths with different absorptance depending on moisture.

In the media detection apparatus (detection apparatus 20) of the present embodiment, the first light emitter 231 emits reference light, the second light emitter 232 emits light having a wavelength with a greater absorptance depending on moisture than the reference light, and the moisture information controller (detection controller 21) determines moisture information on the basis of temperature information corresponding to the temperature of the media detection apparatus and the output of the light receiver 233 with respect to the reference light and the light emitted by the second light emitter 232.

In the media detection apparatus (detection apparatus 20) of the present embodiment, the moisture information controller (detection controller 21) determines the moisture information on the basis of temperature information corresponding to the temperature of the media detection apparatus and the ratio of the output of the light receiver 233 with respect to the reference light and the light emitted by the second light emitter 232.

In the media detection apparatus (detection apparatus 20) of the present embodiment, the moisture information controller (detection controller 21) determines the moisture information on the basis of temperature information corresponding to the temperature of the second light emitter 232 and the output of the light receiver 233.

Thus, it is possible to determine the moisture information corresponding to the moisture amount or the moisture percentage of the sheet according to the temperature of information corresponding to the temperature of the second light emitter 232.

In addition, the media detection apparatus (detection apparatus 20) of the present embodiment includes the temperature detection sensor 234 that detects the temperature of the media detection apparatus, and the temperature information corresponding to the temperature of the media detection apparatus is temperature information corresponding to a detection result from the temperature detection sensor 234.

Accordingly, the temperature information corresponding to the temperature of the media detection apparatus can be easily acquired by the temperature detection sensor 234.

Furthermore, in the media detection apparatus (detection apparatus 20) of the present embodiment, the moisture information controller (detection controller 21) determines the moisture information while the sheet is being conveyed.

Thus, the moisture information corresponding to the moisture amount or the moisture percentage of the sheet being conveyed can be detected more accurately.

Furthermore, in the media detection apparatus (detection apparatus 20) of the present embodiment, the moisture information controller (detection controller 21) determines moisture information for each sheet.

Thus, the moisture information corresponding to the moisture amount or the moisture percentage of the sheet can be detected more accurately for each sheet.

In the media detection apparatus (detection apparatus 20) of the present embodiment, the moisture information controller (detection controller 21) determines the moisture information a plurality of times for one sheet.

Thus, the moisture information corresponding to the moisture amount or the moisture percentage of the sheet can be detected more accurately within one sheet.

In the media detection apparatus (detection apparatus 20) of the present embodiment, the moisture information controller (detection controller 21) determines moisture information on the basis of temperature information corresponding to the temperature of the media detection apparatus detected while the sheet is being conveyed and the output of the light receiver 233.

Thus, it is possible to determine the moisture information corresponding to the moisture amount or the moisture percentage of the sheet according to the temperature information corresponding to the temperature of the media detection apparatus while the sheet is being conveyed.

In addition, in the media detection apparatus (detection apparatus 20) of the present embodiment, the light emitter (first light emitter 231 and second light emitter 232) and the light receiver 233 are included in the first media sensor 23, and the temperature information corresponding to the temperature of the media detection apparatus is the temperature information corresponding to the temperature of the first media sensor.

Thus, it is possible to determine the moisture information corresponding to the moisture amount or the moisture percentage of the sheet according to the temperature of information corresponding to the temperature of the first media sensor 23.

In addition, in the media detection apparatus (detection apparatus 20) of the present embodiment, the first media sensor 23 is disposed on the conveyance path of the sheet.

Thus, the moisture information corresponding to the moisture amount or the moisture percentage of the sheet on the conveyance path can be detected.

Furthermore, in the media detection apparatus (detection apparatus 20) of the present embodiment, the first media sensor 23 is disposed on the conveyance path of the sheet for conveying the sheet to the image forming section 38 capable of forming an image on the sheet.

Thus, it is possible to detect the moisture information corresponding to the moisture amount or the moisture percentage of the sheet before image formation.

Further, in the media detection apparatus (detection apparatus 20) of the present embodiment, the moisture information controller (detection controller 21) determines provisional moisture information on the basis of the output of the light receiver 233, and determines the moisture information by correcting the provisional moisture information on the basis of the temperature information corresponding to the temperature of the media detection apparatus.

Thus, it is possible to determine the moisture information corresponding to the moisture amount or the moisture percentage of the sheet according to the temperature information corresponding to the temperature of the media detection apparatus.

In addition, in the media detection apparatus (detection apparatus 20) of the present embodiment, the moisture information controller (detection controller 21) acquires the information on the wavelength of light emitted by the light emitters (first light emitter 231 and second light emitter 232) on the basis of the temperature of the light emitters, and corrects the provisional moisture information on the basis of the acquired information on the wavelength.

Thus, it is possible to determine the moisture information corresponding to the moisture amount or the moisture percentage of the sheet according to the temperature information corresponding to the temperature of the light emitters.

Further, the media detection apparatus (detection apparatus 20) according to the present embodiment includes the temperature detection sensor 234 that detects the temperature of the media detection apparatus, and the moisture information controller (detection controller 21) makes a correction so that the provisional moisture information is lowered when the detected temperature according to the temperature detection sensor 234 is higher than a reference temperature, and so that the provisional moisture information is raised when the detected temperature is lower than the reference temperature.

Thus, it is possible to determine the moisture information corresponding to the moisture amount or the moisture percentage of the sheet according to the temperature of information corresponding to the temperature of the media detection apparatus.

In addition, in the media detection apparatus (detection apparatus 20) of the present embodiment, the light emitter (first light emitter 231 and second light emitter 232) includes a light-emitting diode (LED).

Therefore, the moisture information corresponding to the moisture amount or the moisture percentage of the sheet can be detected more accurately, even in a case where the light emitter self-heats and the wavelength of the light emitted by the light emitter changes.

Furthermore, in the media detection apparatus (detection apparatus 20) according to the present embodiment, the temperature detection sensor 234 is disposed in contact with a member (support member 237) supporting the light emitter (first light emitter 231 and second light emitter 232).

Thus, the temperature of the light emitter can be detected accurately.

Furthermore, in the media detection apparatus (detection apparatus 20) according to the present embodiment, the temperature detection sensor 234 is disposed in non-contact with and opposite to the light emitter (first light emitter 231 and second light emitter 232).

Thus, the temperature of the light emitter can be detected accurately.

Further, in the media detection apparatus (detection apparatus 20) of the present embodiment, the moisture information controller (detection controller 21) determines the moisture information on the basis of the paper type of the sheet.

Thus, it is possible to determine the moisture information corresponding to the moisture amount or the moisture percentage of the sheet according to the paper type of the sheet.

The media detection apparatus (detection apparatus 20) of the present embodiment also includes the second media sensor 24 for detecting a physical property corresponding to paper type, and a paper type determiner (detection controller 21) that determines a paper type on the basis of a detection result from the second media sensor 24.

In the media detection apparatus (detection apparatus 20) of the present embodiment, the second media sensor 24 is a basis weight sensor.

Accordingly, the paper type can be determined easily by detecting the basis weight of the sheet.

Furthermore, the image forming system 100 of the present embodiment includes the media detection apparatus (detection apparatus 20) and the image forming section 38 capable of forming an image on a sheet, the image forming system including a process condition controller (controller 31) that determines, on the basis of the moisture information determined by the moisture information controller (detection controller 21), process conditions for image formation in the image forming section 38.

Thus, it is possible to determine the process conditions according to the moisture information corresponding to the moisture amount or the moisture percentage of the sheet detected with higher accuracy.

Furthermore, in the image forming system 100 of the present embodiment, the process conditions include transfer conditions.

Thus, it is possible to determine the transfer conditions according to the moisture information corresponding to the moisture amount or the moisture percentage of the sheet detected with higher accuracy.

In the image forming system 100 according to the present embodiment, the transfer conditions includes a transfer current and a transfer voltage.

Thus, it is possible to determine the transfer current and the transfer voltage according to the moisture information corresponding to the moisture amount or the moisture percentage of the sheet detected with higher accuracy.

Furthermore, the image forming system 100 of the present embodiment includes the image forming section 38 that forms an image on a sheet, the media detection apparatus (detection apparatus 20) for detecting moisture information corresponding to the moisture amount or the moisture percentage of the sheet, and the process condition controller (controller 31) that determines process conditions in the image forming section 38, wherein the media detection apparatus includes the light emitter (first light emitter 231 and second light emitter 232) that emits light and the light receiver 233 that receives the light reflected off or transmitted through the sheet, and the process condition controller determines process conditions on the basis of temperature information corresponding to the temperature of the media detection apparatus and the output of the light receiver 233.

Thus, it is possible to determine process conditions according to the moisture information corresponding to the moisture amount or the moisture percentage of the sheet according to the temperature information corresponding to the temperature of the media detection apparatus.

A media detection program of the present embodiment is a media detection program for detecting moisture information corresponding to the moisture amount or the moisture percentage of a sheet, and can cause a computer (detection controller 21) to execute: acquiring temperature information corresponding to the temperature of the media detection apparatus (detection apparatus 20) including the light emitter (first light emitter 231 and second light emitter 232) that emits light and the light receiver 233 that receives light reflected off or transmitted through the sheet; and determining moisture information on the basis of the temperature information corresponding to the temperature of the media detection apparatus and the output of the light receiver 233.

Thus, it is possible to determine the moisture information corresponding to the moisture amount or the moisture percentage of the sheet according to the temperature information corresponding to the temperature of the media detection apparatus.

A process condition control program of the present embodiment is a process condition control program for determining process conditions for forming an image on a sheet in the image forming section 38, and can cause a computer (controller 31) to execute: acquiring temperature information corresponding to the temperature of the media detection apparatus (detection apparatus 20) including the light emitter (first light emitter 231 and second light emitter 232) that emits light and the light receiver 233 that receives the light reflected off or transmitted through the sheet; and determining process conditions on the basis of the temperature information corresponding to the temperature of the media detection apparatus and the output of the light receiver 233.

Thus, it is possible to determine process conditions according to the moisture information corresponding to the moisture amount or the moisture percentage of the sheet according to the temperature information corresponding to the temperature of the media detection apparatus.

Note that the description in the above embodiment is an example of a media detection apparatus, an image forming system, a media detection program, and a process condition control program according to the present invention, and the present invention is not limited thereto. The detailed configuration and detailed operation of each unit constituting the apparatus can be changed as appropriate without departing from the scope of the present invention.

For example, the above embodiment describes a case in which the detection controller 21 is a moisture information controller, but is not limited thereto. The controller 31 of the image forming apparatus 30 may function as the moisture information controller. In this case, the controller 31 acquires, from the detection apparatus 20, temperature information corresponding to the temperature of the media detection apparatus and the output of the light receiver 233, and determines moisture information corresponding to the moisture amount or the moisture percentage of the sheet.

In the above embodiment, the first media sensor 23 is provided on the conveyance path on the upstream side of the image forming section 38 in the sheet conveyance direction, and outputs the first light reception amount and the second light reception amount with respect to the sheet before image formation, but is not limited thereto. The first media sensor 23 may be provided on the conveyance path on the downstream side of the image forming section 38 in the sheet conveyance direction, and output the first light reception amount and the second light reception amount with respect to the sheet after image formation. Further, the first media sensor 23 may be provided on the conveyance path on both the upstream and downstream sides of the image forming section 38 in the sheet conveyance direction.

Also, the above embodiment illustrates an example in which the media detection apparatus is applied to the electrophotographic image forming apparatus 30, but is not limited thereto, and the media detection apparatus may also be applied to an inkjet image forming apparatus or another type of image forming apparatus.

Although embodiments of the present invention have been described and illustrated in detail, the disclosed embodiments are made for purposes of illustration and example only and not limitation. The scope of the present invention should be interpreted by terms of the appended claims.

What is claimed is:

1. A media detection apparatus for detecting moisture information corresponding to a moisture amount or a moisture percentage of a sheet, the media detection apparatus comprising:
   a light emitter that emits light;
   a light receiver that receives the light reflected off the sheet or transmitted through the sheet; and
   a first hardware processor that determines a value indicating the moisture information on the basis of temperature information corresponding to a temperature of the media detection apparatus and an output of the light receiver.

2. The media detection apparatus according to claim 1, wherein the first hardware processor determines the moisture information on the basis of temperature information corresponding to a temperature of the light emitter and the output of the light receiver.

3. The media detection apparatus according to claim 1, wherein the light emitter includes a first light emitter and a second light emitter that emits light having wavelengths with different absorptance depending on moisture.

4. The media detection apparatus according to claim 3, wherein:
   the first light emitter emits reference light;
   the second light emitter emits light having a wavelength with a greater absorptance depending on moisture than the reference light; and
   the first hardware processor determines the moisture information on the basis of the temperature information and the output of the light receiver with respect to the reference light and the light emitted by the second light emitter.

5. The media detection apparatus according to claim 4, wherein the first hardware processor determines the moisture information on the basis of the temperature information and a ratio of the output of the light receiver with respect to the reference light and the light emitted by the second light emitter.

6. The media detection apparatus according to claim 4, wherein the first hardware processor determines the moisture information on the basis of temperature information corresponding to a temperature of the second light emitter and the output of the light receiver.

7. The media detection apparatus according to claim 1, further comprising:
   a temperature detection sensor that detects a temperature of the media detection apparatus, wherein
   the temperature information corresponding to the temperature of the media detection apparatus is temperature information corresponding to a detection result from the temperature detection sensor.

8. The media detection apparatus according to claim 1, wherein the first hardware processor determines the moisture information while the sheet is being conveyed.

9. The media detection apparatus according to claim 8, wherein the first hardware processor determines the moisture information individually for the sheet.

10. The media detection apparatus according to claim 8, wherein the first hardware processor determines the moisture information a plurality of times for a single one of the sheet.

11. The media detection apparatus according to claim 8, wherein the first hardware processor determines the moisture information on the basis of the temperature information while the sheet is being conveyed and the output of the light receiver.

12. The media detection apparatus according to claim 1, wherein:
   the light emitter and the light receiver are included in a first media sensor; and
   the temperature information corresponding to the temperature of the media detection apparatus is temperature information corresponding to a temperature of the first media sensor.

13. The media detection apparatus according to claim 12, wherein the first media sensor is disposed on a conveyance path of the sheet.

14. The media detection apparatus according to claim 13, wherein the first media sensor is disposed on a conveyance path of the sheet to convey the sheet to an image former capable of forming an image on the sheet.

15. The media detection apparatus according to claim 1, wherein the first hardware processor determines provisional moisture information on the basis of the output of the light receiver, and determines the moisture information by correcting the provisional moisture information on the basis of temperature information corresponding to a temperature of the media detection apparatus.

16. The media detection apparatus according to claim 15, wherein the first hardware processor acquires information on a wavelength of light emitted by the light emitter on the basis of a temperature of the light emitter, and corrects the provisional moisture information on the basis of the acquired information on the wavelength.

17. The media detection apparatus according to claim 15, further comprising:
   a temperature detection sensor that detects a temperature of the media detection apparatus, wherein
   the first hardware processor makes a correction so that the provisional moisture information is lowered when the detected temperature according to the temperature detection sensor is higher than a reference temperature, and so that the provisional moisture information is raised when the detected temperature is lower than the reference temperature.

18. The media detection apparatus according to claim 1, wherein the light emitter includes a light-emitting diode (LED).

19. The media detection apparatus according to claim 7, wherein the temperature detection sensor is disposed in contact with a member supporting the light emitter.

20. The media detection apparatus according to claim 7, wherein the temperature detection sensor is disposed in non-contact with and opposite to the light emitter.

21. The media detection apparatus according to claim 1, wherein the first hardware processor determines the moisture information on the basis of a paper type of the sheet.

22. The media detection apparatus according to claim 21, further comprising:
   a second media sensor for detecting a physical property corresponding to the paper type; and
   a paper type determiner that determines the paper type on the basis of a detection result from the second media sensor.

23. The media detection apparatus according to claim 22, wherein the second media sensor is a basis weight sensor.

24. An image forming system comprising:

the media detection apparatus according to claim 1; and an image former capable of forming an image on the sheet, wherein the image forming system comprises a process condition controller that determines process conditions for image formation in the image former on the basis of the moisture information determined by the first hardware processor.

25. The image forming system according to claim 24, wherein the process conditions include transfer conditions.

26. The image forming system according to claim 25, wherein the transfer conditions include a transfer current and a transfer voltage.

27. An image forming system comprising:

an image former that forms an image on a sheet;

a media detection apparatus that detects moisture information corresponding to a moisture amount or a moisture percentage of the sheet; and a second hardware processor that determines process conditions in the image former, wherein the media detection apparatus includes a light emitter that emits light and a light receiver that receives the light reflected off the sheet or transmitted through the sheet, and the second hardware processor determines the process conditions on the basis of temperature information corresponding to a temperature of the media detection apparatus and an output of the light receiver, not based on the humidity of the media detection apparatus.

28. A non-transitory computer-readable recording medium storing a media detection program for detecting moisture information corresponding to a moisture amount or a moisture percentage of a sheet, the media detection program causing a computer to execute:

acquiring temperature information corresponding to a temperature of a media detection apparatus including a light emitter that emits light and a light receiver that receives the light reflected off the sheet or transmitted through the sheet; and determining a value indicating the moisture information on the basis of temperature information corresponding to a temperature of the media detection apparatus and an output of the light receiver.

29. A non-transitory computer-readable recording medium storing a process condition control program for determining process conditions for forming an image on a sheet in an image former, the process condition control program causing a computer to execute:

acquiring temperature information corresponding to a temperature of a media detection apparatus including a light emitter that emits light and a light receiver that receives the light reflected off the sheet or transmitted through the sheet; and determining the process conditions on the basis of temperature information corresponding to a temperature of the media detection apparatus and an output of the light receiver, not based on the humidity of the media detection apparatus.

* * * * *